United States Patent [19]

Sargent

[11] Patent Number: 4,505,619
[45] Date of Patent: Mar. 19, 1985

[54] COMBINED BOAT TRAILER AND PORTABLE DOCK APPARATUS

[76] Inventor: Harold L. Sargent, P.O. Box 300, Cortaro, Ariz. 85230

[21] Appl. No.: 351,319

[22] Filed: Feb. 22, 1982

[51] Int. Cl.³ .................. B60D 3/10; B63C 1/00; B63C 13/00
[52] U.S. Cl. ........................... 405/220; 405/1; 405/218; 114/263; 114/344; 280/414.1
[58] Field of Search ............... 405/1, 218–221; 114/344, 267, 263, 270; 280/414.1, 414.2, 414.3; 414/494, 506, 559

[56] References Cited

U.S. PATENT DOCUMENTS

| | | | |
|---|---|---|---|
| 2,948,121 | 8/1960 | Karst | 405/220 |
| 3,124,259 | 3/1964 | Goettl | 114/344 X |
| 3,126,855 | 3/1964 | Freeburg | 114/263 X |
| 3,229,833 | 1/1966 | Heck et al. | 405/218 X |
| 3,262,139 | 7/1966 | Campbell | 405/218 X |
| 3,539,066 | 11/1970 | Stevenson | 114/344 X |
| 3,686,876 | 8/1972 | Muschell | 405/220 |
| 3,861,340 | 1/1975 | Clingenpeei | 405/218 X |
| 4,092,755 | 6/1978 | Hughes | 114/344 |
| 4,126,006 | 11/1978 | Lewis | 405/220 |
| 4,169,296 | 10/1979 | Wipkink et al. | 405/220 X |

Primary Examiner—Cornelius J. Husar
Assistant Examiner—Nancy J. Stodola
Attorney, Agent, or Firm—Cahill, Sutton & Thomas

[57] ABSTRACT

A wheeled boat trailer of the type used to tow a boat to a body of water is provided with a walkway leading to a dock ramp hingedly coupled to the rear end of the trailer for rearward extension into the body of water after the boat has been launched. Downwardly extendable support legs are mounted to the end of the dock ramp furthest from the trailer to support the dock ramp above the water surface. A pulley mounted atop a mast removably secured to the trailer near the rear portion thereof allows a conventional front-mounted trailer winch to elevate the dock ramp while the trailer is backed into or pulled from the water. When not in use, the dock ramp may be pivoted about its hinged coupling to a stowed position extending forwardly across the trailer. The dock ramp may be positioned along the longitudinal axis of the trailer, and the underside of the dock ramp may incorporate rollers for engaging and supporting the keel of the boat when the dock ramp is in the stowed position. One or more dock ramp extensions may be coupled to and extend from the dock ramp for increasing the effective length of the portable dock.

3 Claims, 17 Drawing Figures

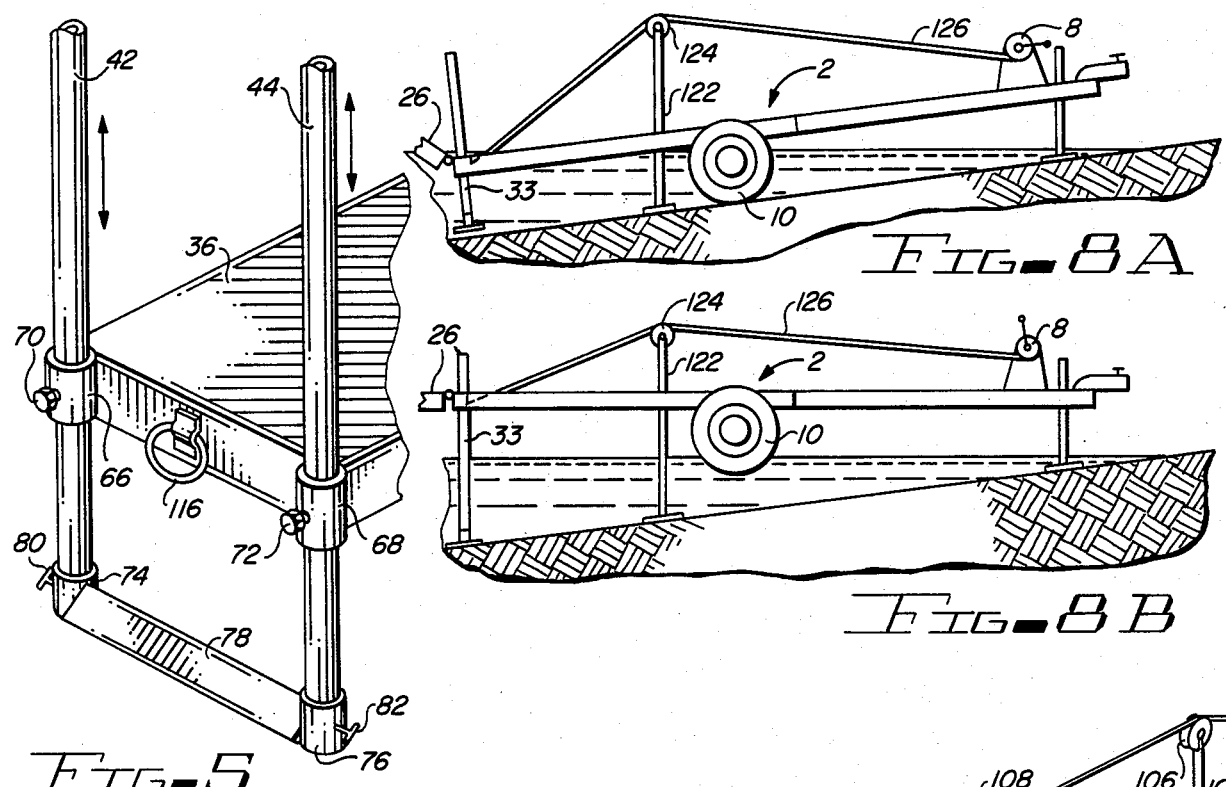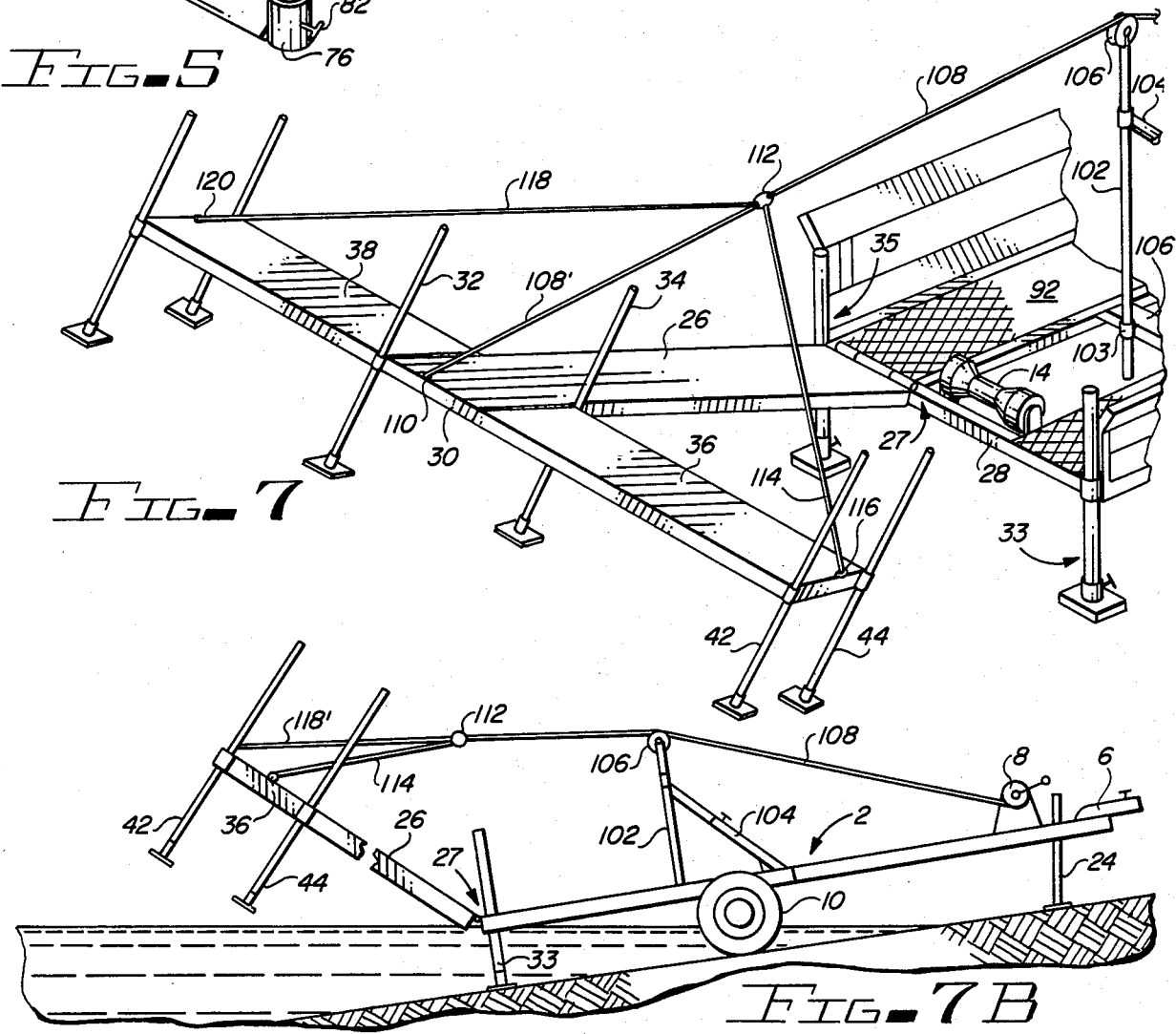

COMBINED BOAT TRAILER AND PORTABLE DOCK APPARATUS

BACKGROUND OF THE INVENTION

1. Field of the Invention

The present invention relates generally to boat trailers, and more particularly, to a boat trailer capable of serving as a portable docking facility after the boat carried by the trailer has been launched.

2. Description of the Prior Art

In many popular boating areas, lack of sufficient docking facilities forces many users to moor their boats near the shoreline in several feet of water and without any convenient means for entering or leaving the boat. Consequently, the only manner in which persons may reach the boat from shore is by wading into the water and climbing aboard. Aside from the resulting inconvenience of getting one's feet wet or donning hip boots, many small children and even some adults, particularly those who may be handicapped, may be physically unable to enter or leave the boat in this manner. Furthermore, if the shore is somewhat rocky, then mooring the boat in this manner often results in damage to the bottom of the boat due to scraping thereof against the rocks.

In view of the problems mentioned above, others have previously suggested various modifications to boat trailers for allowing the same to serve as portable docks after the boat carried by the trailer has been launched into the body of water. For example, U.S. Pat. No. 3,126,855 described a boat trailer incorporating a pair of pontoons as well as a pair of hinged cover panels which may be folded down after the boat is launched to provide a floating dry dock. U.S. Pat. No. 3,262,139 discloses a combination trailer and dock wherein a bolster is pivotally coupled to the rear end of a boat trailer and is rotated to a vertical position after the boat is launched for allowing the boat to be docked alongside thereof. As the bolster rotates upwardly, a deck rises from the trailer frame to provide a platform for entering or leaving the boat. A catwalk is secured to the trailer and provides access to the elevated deck. U.S. Pat. No. 3,539,066 describes a boat trailer and dock wherein the rear end of the trailer frame is provided with a boat bow nesting recess. The recess is normally covered by a boat supporting bolster which is swung to one side of the recess after the boat is launched. In addition, U.S. Pat. No. 4,092,755, issued to Hughes, discloses a boat trailer equipped with a wooden deck and including vertically adjustable anchor bars at rear corners of the trailer frame for anchoring the trailer; the anchor bars may be used in conjunction with a demountable winch to lift the rear end of the trailer above the water surface. The trailer is provided with wheel assemblies to be removed after the boat is launched in order to avoid water damage to the wheel bearings associated therewith.

While each of the above described prior art combination trailers and portable docks are preferable to the lack of any docking facilities at all, each of such prior art devices is subject to certain limitations not found within the present invention. For example, each of the prior art devices is limited with respect to the amount by which it may extend into the body of water. Clearly, such trailers may not be backed into the body of water beyond the point at which the front of the trailer is no longer accessible from shore. The length of most boat trailers typically does not greatly exceed the length of the boat which they are designed to carry, in order to minimize the bulk of the trailer. Thus, the extent to which the rear end of the trailer may be backed into the body of water is approximately equal to the length of the boat itself. However, in many popular boating areas, the depth of the body of water increases rather slowly near the shore. In such instances, the rear end of the trailer may not be positioned at a point wherein the water depth is sufficient to allow safe docking of the boat.

In addition, use of each of the prior art devices mentioned above as a portable dock may often result in the wheels thereof, and the wheel bearings associated therewith, being submerged for a lengthy period of time. Submersion of the wheel bearings for such lengthy periods of time can adversely affect the wheel bearings and the lubricants used therewith. While the device described by Hughes provides for removal of the wheel assemblies from the trailer, removal and subsequent reattachment of the wheels after the trailer has been backed into the body of water is inconvenient and may take a relatively long time to accomplish. Further, construction of each of the above mentioned prior art portable docks requires substantial modification to the structure of most boat trailers commercially available. Such substantial modifications result in a correspondingly large expense in order to incorporate such prior art portable docks within a boat trailer.

Accordingly, it is an object of the present invention to provide a combined boat trailer and portable dock apparatus which may be extended relatively far into the body of water into which the boat has been launched without significantly increasing the overall length or bulk of the boat trailer when the portable dock is not in use.

It is another object of the present invention to provide such a boat trailer and dock apparatus which is of simple and inexpensive construction and which may be deployed relatively quickly after the boat carried by the trailer has been launched.

It is still another object of the present invention to provide such a boat trailer and dock apparatus which substantially reduces the need to submerge the trailer wheel bearings within the body of water for long periods of time while avoiding the need to remove the wheels from the trailer when the portable dock is in use.

It is yet another object of the present invention to provide such a boat trailer and dock apparatus wherein the portable dock can be conveniently assembled on dry land and subsequently backed into the body of water for usage.

It is a further object of the present invention to provide such a boat trailer and dock apparatus wherein the rear end of the trailer may easily be raised above the surface of the water and stabilized without the need for any extra winches in addition to the front-mounted winch typically provided with most boat trailers.

It is a still further object of the present invention to provide such a boat trailer and dock apparatus which facilitates the modification of existing boat trailers to provide the advantages of such a portable dock without undue labor or expense.

It is still another object of the present invention to provide such a boat trailer and dock apparatus which is designed to permit convenient access to a boat docked therewith by persons confined to wheelchairs.

These and other objects of the present invention will become more apparent to those skilled in the art as the description thereof proceeds.

SUMMARY OF THE INVENTION

Briefly described, and in accordance with one embodiment thereof, the present invention relates to a boat trailer and portable dock apparatus including a wheeled boat trailer for carrying a boat, a main dock ramp having a first end hingedly connected to the rear end of the trailer and extending outwardly therefrom toward a second end thereof, and a support mechanism coupled to the main dock ramp near the second end thereof for supporting the same above the surface of the water. The mechanism for supporting the second end of the main ramp preferably includes one or more vertically extendible legs for engaging the bed of the body of water and is preferably adjustable for adjusting the length of such legs to account for water of various depths. The trailer includes a walkway extending generally from the front end to the rear end thereof for providing convenient access to the main dock ramp from shore.

To allow the trailer, and the main dock ramp extending rearwardly therefrom, to be backed into the water, a mechanism is provided for elevating the main dock ramp after the same is assembled on dry land and subsequently lowering the same after the apparatus has been backed sufficiently far into the body of water. The mechanism used to elevate the main ramp may advantageously utilize the winch typically provided with most boat trailers near the front end thereof, together with a pulley supported atop a mast removably mounted to the trailer near the rear end thereof. The winch cable extends over the pulley and is secured to the second end of the main dock ramp for raising and lowering the main dock ramp.

In one embodiment of the present invention, the main dock ramp may be pivoted about its hinged connection to the trailer to a stowed position lying substantially horizontally across the trailer. In instances where it is desirable or necessary for the main dock ramp to be coincident with the longitudinal axis of the trailer, the underside of the main dock ramp may include one or more rollers for engaging and supporting the keel of the boat when the dock ramp is in the stowed position. To raise the main dock ramp from its stowed position rearwardly towards its extended position, a mechanism is provided for pivoting the main dock ramp about its hinged connection. Such pivoting mechanism may take the form of a lever arm extending downwardly from the main dock ramp proximate the hinged connection, along with a cable and a winch for rotating the main dock ramp upwardly and rearwardly when the winch is tightened.

To stabilize the rear end of the trailer after the same is backed into the water, a pair of stabilizer legs are slidingly secured to opposing rear corners of the trailer frame for being extended vertically downward to engage the shore or the bed of the body of water. Fasteners are provided for locking the stabilizer legs at a desired position. A mechanism is also provided for lifting the rear end of the trailer off of the trailer wheels for allowing the stabilizer legs to support the rear end of the trailer. The trailer lifting mechanism preferably includes a leg slidably and downwardly extendible from the trailer for engaging the bed of the body of water. A pulley is secured to the top of the slidable leg; the winch typically provided at the front end of the boat trailer is used to lift the rear end of the trailer by engaging the winch cable over the aforementioned pulley and securing the cable to the trailer at a point behind the slidable leg. The winch is then tightened, forcing the slidable leg downward and lifting the rear end of the trailer with respect thereto.

To further increase access to the portable dock, the frontmost portion of the trailer is preferably equipped with an access ramp extendible from an edge thereof toward the ground. The coupling between the access ramp and the front end of the trailer may be hinged for allowing the access ramp to be folded to a stowed position overlying the front end of the trailer when not in use.

To further increase the effective length of the portable dock for servicing a plurality of boats, one or more dock ramp extensions may be coupled to the second end of the main dock ramp. Each such dock ramp extension is provided with suitable support means, such as support legs for engaging the bed of the body of water, at the end thereof remote from the main dock ramp to support the dock ramp extension above the surface of the water.

BRIEF DESCRIPTION OF THE DRAWINGS

FIG. 5 is a partial perspective view of the support legs used to support the farmost end of the main dock ramp and/or a dock ramp extension.

FIG. 6 is a perspective view of a detachable footing which may be secured to the lower ends of the legs which support the farmost ends of the main dock ramp and the dock ramp extensions as well as the legs which stabilize the rear end of the trailer.

FIG. 7A is a partial perspective view of the rear end of the trailer illustrating the manner in which a winch, cable, and associated mast-supported pulley may be used to elevate the main dock ramp, as well as any dock ramp extensions hinged thereto, for allowing the same to be backed into and withdrawn from the body of water.

FIG. 7B is a side view of the trailer and dock ramps shown in FIG. 7A.

FIGS. 8A and 8B are side views of the trailer showing the manner in which a winch, slidable leg, and associated pulley may be used to lift the rear end of the trailer as well as the wheel bearing assemblies, out of the water and the manner in which the rear stabilizer legs may be used to support and stabilize the trailer in the lifted position.

DESCRIPTION OF THE PREFERRED EMBODIMENT

Figure 1:
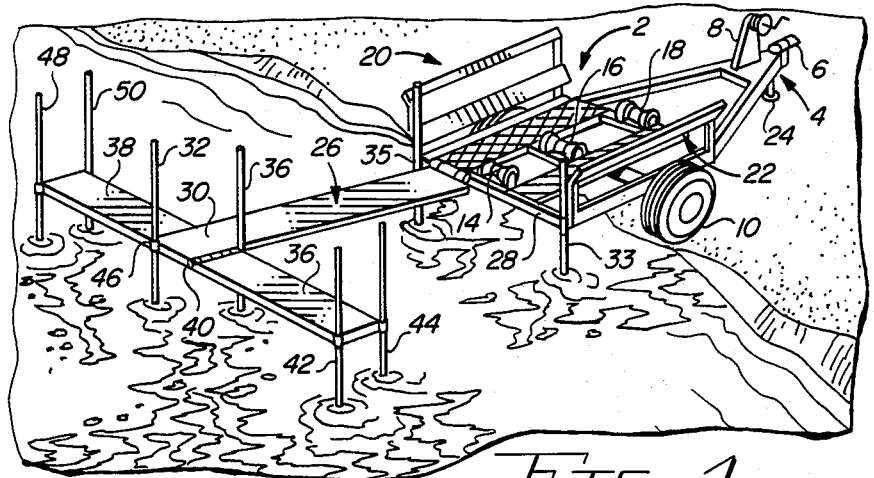
FIG. 1 is a perspective view of a boat trailer and portable dock apparatus according to one embodiment of the present invention and utilizing a main dock ramp having two dock ramp extensions coupled thereto.
Figure 2:
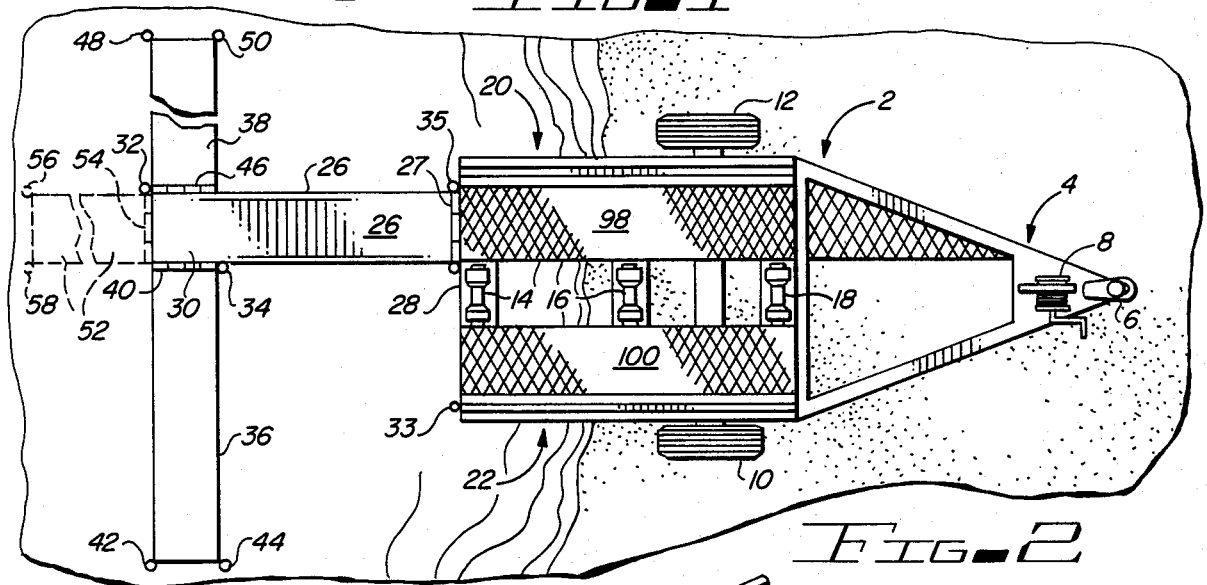
FIG. 2 is a top view of the boat trailer and portable dock apparatus shown in FIG. 1 and showing a third dock ramp extension in dashed outline.

With reference to FIGS. 1 and 2, a combined boat trailer and portable dock apparatus is shown including a wheeled boat trailer designated generally by reference numeral 2. The wheeled boat trailer 2 is of the type generally used to tow a boat to a body of water and includes a front end 4 equipped with a towing bar 6 from which the wheeled boat trailer may be towed by a motorized vehicle. A crank-operated winch 8 is secured to the front end of trailer 2 and may be used in the normal manner for pulling the boat from the water onto trailer 2 when boating activities are completed. The trailer 2 is normally supported by a pair of wheels 10 and 12. In addition, trailer 2 typically includes a plurality of rollers 14, 16 and 18 positioned along the longitudinal axis thereof for engaging and supporting the keel of the boat. Trailer 2 also preferably includes a pair of padded opposing side rail assemblies 20 and for further supporting the boat when being carried by the trailer. In addition, trailer 2 may include a retractable front stand 24 downwardly extendable from front end 4 to support the same when towbar 6 is uncoupled from the towing vehicle. Features of wheeled boat trailer 2 thus far described are fairly typical to a wide variety of boat trailers presently in use.

In order to form the portable dock, a main dock ramp 26 is coupled at a first end thereof to the rear end 28 of trailer 2 by hinge 27. As shown in FIGS. 1 and 2, main dock ramp 26 extends outwardly and rearwardly from rear end 28 of trailer 2 in an extended position over the body of water in which the boat has been launched. The end of main dock ramp 26 furthest from trailer 2, designated within the drawings by reference numeral 30, is supported above the surface of the water by a pair of support legs 32 and 34 which extend downwardly therefrom and rest upon the bed of the body of water. In addition, stabilizer legs 33 and 35 extend downwardly from opposing rear corners of trailer 2 and rest upon the bed of the body of water. The manner in which support legs 32, 34 and stabilizer legs 33, 35 are constructed is described in greater detail below.

Still referring to FIGS. 1 and 2, a first dock ramp extension 36 and a second dock ramp extension 38 are each shown extending in opposing directions from end 30 of main ramp 26 and perpendicular thereto. A first end of ramp 36 is connected by hinge 40 to a side edge of main ramp 26, and the second end of dock ramp extension 36 is supported by support legs 42 and 44. Similarly, a first end of dock ramp extension 38 is connected to an opposing side edge of main dock ramp 26 by hinge 46, and the second end of dock ramp extension 38 is supported by support legs 48 and 50. As shown in FIG. 2, a third such dock ramp extension, indicated by dashed lines 52, may extend colinearly with main dock ramp 26 from second end 30 thereof. Dock ramp extension 52 is secured to main dock ramp 26 by a hinged coupling 54, and the second end of dock ramp extension 52 is supported by support legs 56 and 58.

Figure 3:
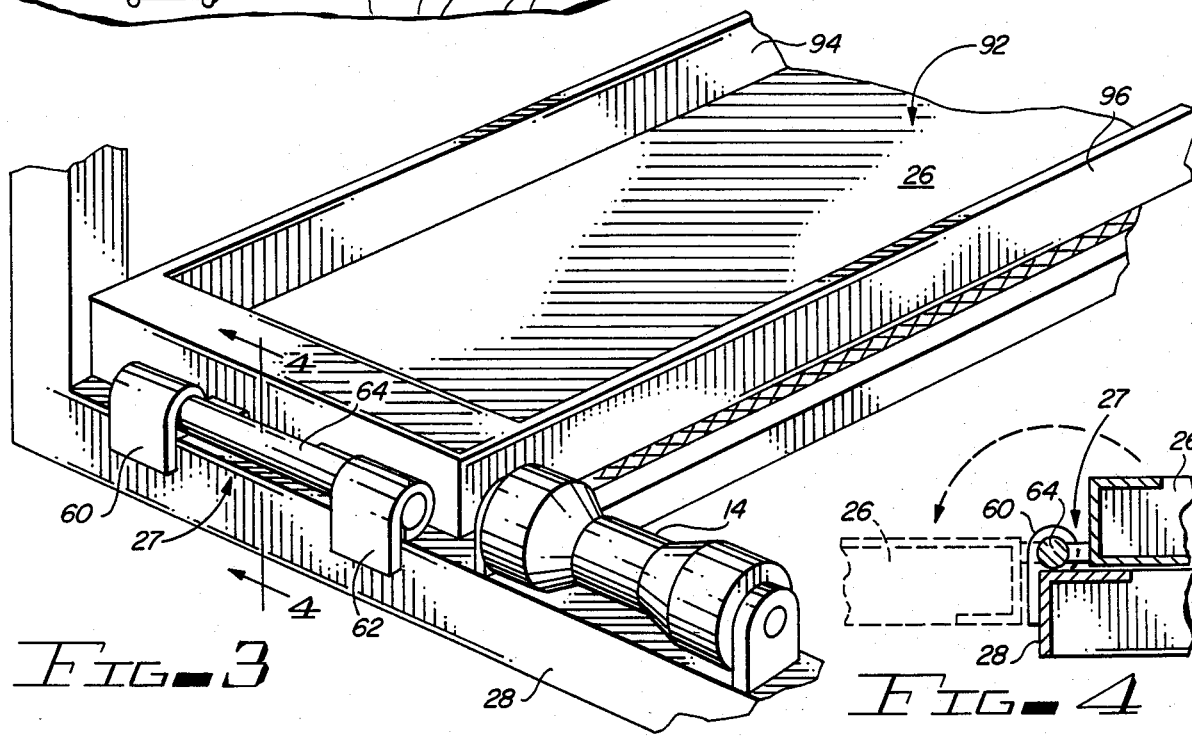
FIG. 3 is a partial perspective view of the rear end of the boat trailer showing the main dock ramp in a stowed position.
Figure 4:
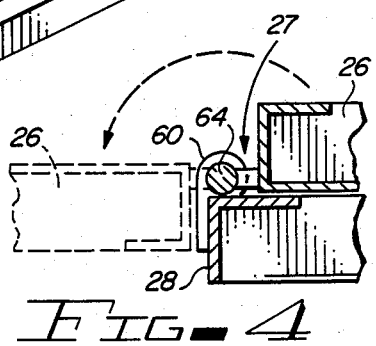
FIG. 4 is a cross-sectional view of the hinged connection between the main dock ramp and the rear end of the boat trailer taken through the plane indicated by lines 4—4 shown in FIG. 3.

FIGS. 3 and 4 illustrate the hinged connection 27 between main dock ramp 26 and rear end 28 of trailer 2. Hinged connection 27 is formed by a pair of curled steel hinge members 60 and 62 welded at their lowermost portions to a frame member extending along the rear end 28 of trailer 2; the upper portions of hinge members 60 are curled about a shaft 64 welded to an end of main dock ramp 26. As shown in FIG. 4, hinged connection 27 allows main dock ramp 26 to be pivoted between a stowed position (shown by solid lines 26 within FIG. 4) lying horizontally across the floor of the trailer to an extended position (shown by dashed lines 26 within FIG. 4) corresponding to the position shown in FIGS. 1 and 2. A similar hinge construction may be used to provide hinges 40, 46 and 54 with regard to dock ramp extensions 36, 38 and 52, respectively. However, unlike hinge 27, hinges 40, 46 and 54 incorporate removable hinge pins to allow the dock ramp extensions to be disconnected from main ramp 26 for storage upon trailer 2 when not in use.

Referring now to FIG. 5, the manner in which support legs 42 and 44 are affixed to dock ramp extension 36 is shown in greater detail. Collar members 66 and 68 are welded to opposing corners of the end of dock ramp extension 36 opposite main dock ramp 26. The inner diameter of collars 66 and 68 is commensurate with the outer diameters of tubular supporting legs 42 and 44. Collars 66 and 68 are provided with threaded fasteners 70 and 72, respectively, which adjustably lock the position of support legs 42 and 44 relative to dock ramp extension 36. The lowermost ends of legs 42 and 44 are engaged within collars 74 and 76, respectively, which are in turn welded to opposite ends of a horizontal member 78 formed of V-shaped angle iron for resting upon the bed of the body of water. The V of member 78 may be directed either downwardly for engaging muddy surfaces (as shown in FIG. 5) or upwardly for engaging rocky surfaces. Alternatively, horizontal member 78 may simply be made from a flat steel plate. Threaded fasteners 80 and 82 allow legs 42 and 44 to be withdrawn from collars 74 and 76 to facilitate storage of the support legs when not in use. When assembling the portable dock, fasteners 70 and 72 are loosened, and legs 42 and 44 are slidingly extended downwardly through collars 66 and 68 to a sufficient length for supporting dock ramp extension 36 above the surface of the water.

While the foregoing description has been directed specifically to support legs 42 and 44 of dock ramp extension 36, those skilled in the art will appreciate that support legs 48 and 50 and support legs 56 and 58 may be secured to dock ramp extensions 38 and 52, respectively, in a similar manner. Support legs 32 and 34 are secured to the end of main dock ramp 26 in a similar manner, as are stabilizer legs 33 and 35 to rear end 28 of trailer 2.

In an alternate embodiment of the present invention, horizontal member 78 is eliminated, and a foot of the type shown in FIG. 6 and designated generally by reference numeral 84, is individually secured to the lower end of each support leg. As shown in FIG. 6, foot 84 includes a collar 86 for receiving the lower portion of a support leg and a threaded fastener 88 for releasably securing the support leg within collar 86. The lower portion of collar 86 terminates in a horizontally disposed base 90 for resting upon the bed of the body of water.

With reference to FIGS. 1 and 2, those skilled in the art will appreciate that once backed into the water, main dock ramp 26 may be used alone, or in conjunction with one or more of dock ramp extensions 36, 38, and 52 for safely docking one or more boats. The height of end 30 of main dock ramp 26 may easily be adjusted to suit the needs of the particular boat docked therewith. To facilitate access to main dock ramp 26, a walkway 98 is formed upon the floor of trailer 2 and extends generally from the front end 4 toward the rear end 28. Walkway 98 is formed along one side of trailer 2 to avoid interference with keel support rollers 14–18. When the portable dock is not in use, walkway 98 also provides a support over which main dock ramp 26 may lie when in its stowed position. A horizontal support 100 is also preferably formed on the opposite side of trailer 2 from walkway 92 for supporting one or more dock ramp extensions when the portable dock is not in use. Referring again briefly to FIG. 3, it will be noted that main dock ramp 26 includes a horizontal portion 92 as well as vertically disposed flanges 94 and 96 along opposing sides thereof. When main dock ramp 26 is in its stowed position as shown in FIG. 3, flanges 94 and 96 extend upwardly and form a storage chamber in conjunction with horizontal portion 92 for storing the various support legs 32, 34, 42, 44, etc., and stabilizer legs 33 and 35, when not in use. Thus, the portable dock may be carried upon trailer 2 in the form of a compact structure when not in use.

Placement of main dock ramp 26 and associated dock ramp extensions 36 and 38 into the body of water is facilitated by a means for elevating end 30 of main dock ramp 26, as well as the remote ends of each dock ramp extension, for allowing trailer 2 to be backed toward the water with support legs 32 and 34, 42 and 44, etc. raised off the ground. After trailer 2 is backed toward the water to the desired extent, the means for elevating the main dock ramp and associated dock ramp extensions may be released for allowing support legs 32 and 34, 42 and 44, etc., to engage the bed of the body of water. In this manner, the portable dock may be completely assembled on dry land and subsequently backed into the water.

FIGS. 7A and 7B illustrate the preferred means for temporarily elevating the main dock ramp 26 and associated dock ramp extensions 36 and 38 when the portable dock is either being placed into the water or being removed therefrom. In order to elevate the portable dock, a temporary mast 102 is slidingly inserted within a collar 103 secured to a cross member 106 near the rear end 28 of trailer 2. To aid in supporting mast 102, a brace 104 may temporarily be secured between the upper portion of mast 102 and the floor of trailer 2. Pulley 106 is rotatably supported atop mast 102 for engaging cable 108 extending from winch 8. Once again, winch 8 may be the winch typically provided at the front end of conventional boat trailers.

In the event that main dock ramp 26 is being used without any dock ramp extensions, the end of cable 108 may be secured directly to end 30 of main dock ramp 26. A ring member 110 is secured to the center of the outermost edge of end 30 to facilitate engagement by cable 108. Alternatively, if one or more dock ramp extensions are used in conjunction with main dock ramp 26, then cable 108 terminates in a coupling ring 112. Cable 108' extends between coupling ring 112 and ring 110 for lifting end 30 of main dock ramp 26. Cable 114 extends between coupling ring 112 and a ring 116 (see FIG. 5) secured to the remote end of dock ramp extension 36. Similarly, cable 118 extends between coupling ring 112 and ring 120 secured to the remote end of dock ramp extension 28. In the event that a third dock ramp extension is used, such as dock ramp extension 52 shown in FIG. 2, then an additional cable extends between the remote end of dock ramp extension 52 and coupling ring 112. Preferably, the lengths of cables 108', 114, and 118 are so selected that initial tightening of cable 108 by winch 8 causes cables 114 and 118 to become tensioned for raising the remote ends of dock ramp extensions 36 and 38 while cable 108' remains somewhat slack for allowing end 30 of main dock ramp 26 to remain resting upon the ground. Further tightening of cable 108 subsequently causes cable 108' to also become tensioned and to lift end 30 of main dock ramp 26 off the ground.

As shown in FIG. 7B, tightening of cable 108 causes main dock ramp 26 to be pivoted upwardly about hinged connection 27 thereby raising each of the ramp support legs above the ground. Trailer 2 may then be backed into the water with the portable dock raised in the elevated position, as shown in FIG. 7B. Winch 8 may then be released for pivoting the portable dock structure downwardly about hinged connection 27 until the support legs rest upon the bed of the body of water. Cables 108', 114, and 118 are then disengaged from rings 110, 116, and 102, respectively, and cable 108 is wound back onto winch 8. Mast 102, brace 104, and pulley 106 may be left in position in preparedness for again elevating the portable dock structure when the same is withdrawn from the water for disassembly. In addition, stabilizer legs 33 and 35 may be extended downwardly to engage the bed of the body of water and locked in position for further stabilizing the rear end 28 of trailer 2.

Within the drawing shown in FIG. 7B, trailer 2 is backed only partially into the water, and the wheel bearing assemblies of wheels 10 and 12 are shown positioned above the surface of the water. However, in some instances, it may be necessary to back trailer 2 further into the water in order to position the portable dock at a depth suitable for allowing a boat to be safely docked therewith. As shown in FIG. 8A, it may be necessary for trailer 2 to be backed into the water to the extent where the wheel bearing assemblies associated with wheels 10 and 12 would otherwise be submerged. To prevent water damage to such wheel bearing assemblies and to further stabilize the rear end of the trailer, the present invention includes a simple means for raising the rear end of the trailer to a height sufficient to position the wheel bearings associated with wheels 10 and 12 above the water surface. In this regard, a vertically disposed leg 122 slidingly extends within a collar (not shown) mounted to a cross member of trailer 2 near the rear portion thereof. Leg 122 and its associated collar may advantageously be identical with mast 102 and its associated collar 103 described with regard to FIG. 7A, with the exception that mast 102 is now allowed to freely slide within collar 103. A horizontally disposed base or foot is secured to the lower end of leg 122 for engaging and being supported by the bed of the body of water. Pulley 124 is rotatably supported atop leg 122 for engaging a cable 126 wound about winch 8. Those skilled in the art will appreciate that winch 8 is once again of the type typically provided near the front end of conventional boat trailers, and will further appreciate that cable 126 may be identical with cable 108 used to elevate the portable dock structure. The end of cable 126 opposite winch 8 is secured to the rear portion of trailer 2.

In actual operation, after trailer 2 has been backed into the body of water by the desired amount, and after main dock ramp 26 and its associated dock ramp extensions have been lowered to rest upon the bed of the body of water, cable 126 is engaged over pulley 124 and secured to the rear portion of trailer 2. Winch 8 is then operated to tighten cable 126, thereby forcing leg 122 downward and raising the rear end of trailer 2 with respect thereto. After both the rear end of trailer 2 and the wheel bearing assemblies of wheels 10 and 12 are sufficiently raised above the surface of the water, stabilizer legs 33 and 35 are released and extended downwardly until they rest upon the bed of the body of water. The stabilizer leg collars are then tightened, and winch 8 is released for allowing the rear end of trailer 2 to be fully supported and stabilized by stabilizer legs 33 and 35.

Figure 9A:
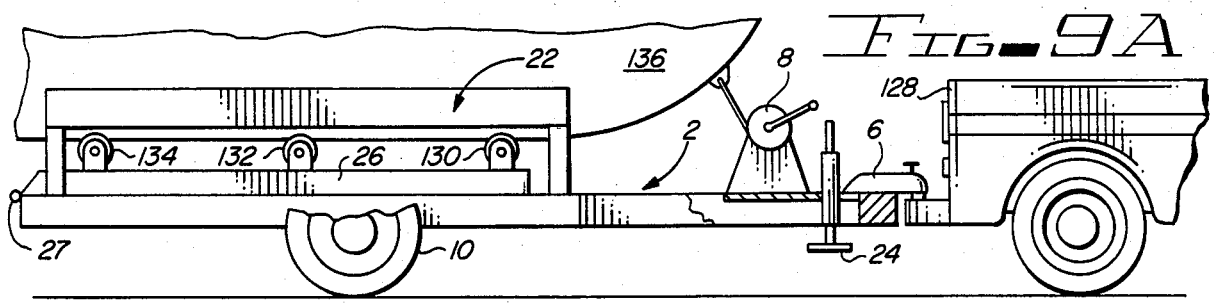
FIGS. 9A and 9B are side views of another embodiment of the boat trailer and dock apparatus wherein the main dock ramp is equipped with keel rollers on the underside thereof and is disposed in a stowed position for supporting the keel of the boat and an extended position for providing a portable dock, respectively.
Figure 9B:
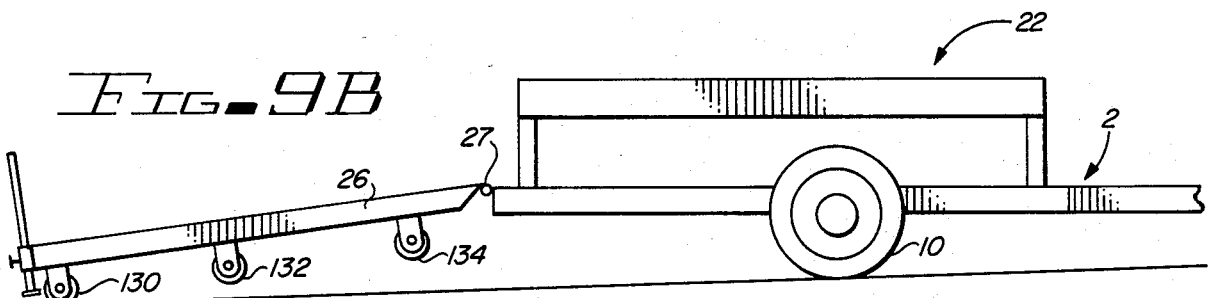

With brief reference to FIG. 1, it has already been noted that walkway 98 and main dock ramp 26 are positioned to one side of the longitudinal axis of trailer 2 in order to avoid interference with keel supporting rollers 14–18. However, FIGS. 9A and 9B illustrate an alternate embodiment of the present invention wherein the main dock ramp and associated trailer walkway are disposed along the longitudinal axis of trailer 2 and wherein the keel supporting rollers are affixed to the underside of main dock ramp 26. As shown in FIG. 9A, when wheeled boat trailer 2 is being towed by a vehicle 128, main dock ramp 26 is disposed in its stowed position overlying the floor of trailer 2. Keel supporting rollers 130, 132, and 134, are rotatably supported from brackets extending upwardly (with reference to FIG. 9A) from the underside of main dock ramp 26 in order to support the keel of boat 136. After boat 136 is launched into the body of water, trailer 2 is pulled back onto the shore, and main dock ramp 26 is pivoted about hinged connection 27 to its rearwardly extended position. The area over which main dock ramp 26 extends when in its stowed position is a horizontal, planar surface and serves as the walkway providing access to main dock ramp 26. Main dock ramp 26 may then be elevated and backed into the water in the same manner as previously described with regard to FIGS. 1–7.

Figure 10:
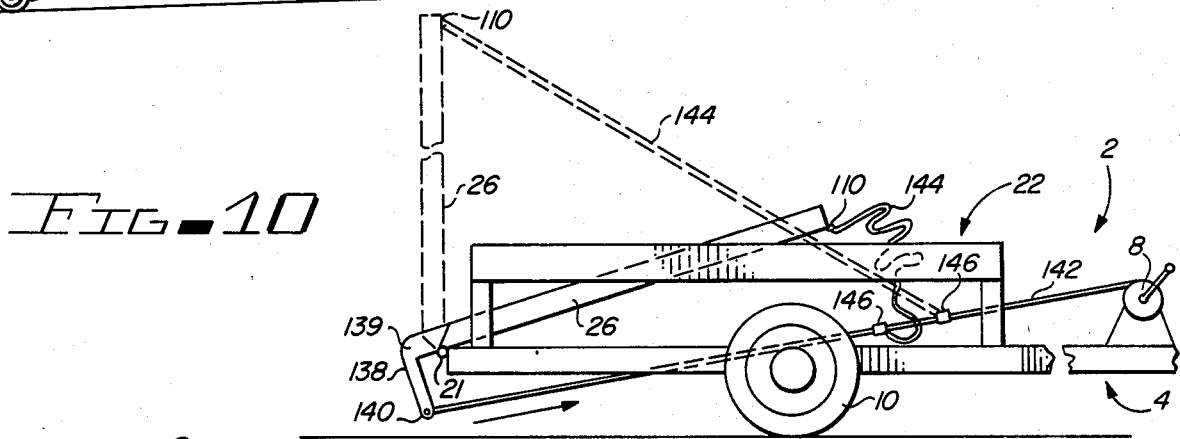
FIG. 10 is a side view of the trailer and portable dock apparatus shown in FIG. 1 but including a lever arm used in cooperation with a winch cable to raise the main dock ramp and pivot the same rearwardly.

Another aspect of the present invention relates to a mechanism for aiding the user in pivoting main dock ramp 26 from its stowed position lying across trailer 2 to its extended position. With reference to FIG. 10, one form of such a pivoting mechanism is shown utilizing a winch of the type commonly provided near the front end of a wheeled boat trailer. A lever arm 138 has a first end 139 thereof secured to main dock ramp 26 proximate hinge 27. In the preferred embodiment, lever arm 138 extends generally downward when main dock ramp 26 is in its stowed position. Lever arm 138 includes a second end 140 opposite first end 139. Winch 8 is once again located near the front end 4 of trailer 2, and cable 142 extends between winch 8 and second end 140 of crank arm 138. A safety cable 144 has a first end thereof secured to ring 110 of main dock ramp 26 and a second end thereof secured by coupler 146 to cable 142 intermediate winch 8 and lever arm 138.

In actual operation of the above described pivoting mechanism, tightening winch 8 causes cable 142 to pull forwardly and upwardly on second end 140 of lever arm 138, thereby pivoting main dock ramp 26 about hinged connection 27 upwardly and away from its stowed position. As shown in FIG. 10, safety cable 144 is initially slack and does not at first impede the pivoting of main dock ramp 26. Continued tightening of winch 8 eventually results in main dock ramp 26 being pivoted to an essentially vertical position as shown by the dashed lines 26 within FIG. 10. At this stage of the operation of the pivoting mechanism, safety cable 144 becomes tensioned as indicated by dashed lines 144 within FIG. 10. When main dock ramp 26 is slightly over center and leaning somewhat rearwardly, the user disengages main cable 142 from end 140 of lever arm 138, thereby allowing main dock ramp 26 to lean ever further rearward until safety cable 144 and the portion of main cable 142 between winch 8 and coupler 146 are again fully tensioned. Winch 8 may then be slowly released to allow main dock ramp 26 to pivot fully counterclockwise (with respect to FIG. 10) to an essentially horizontal, rearwardly extending position.

Figure 11:
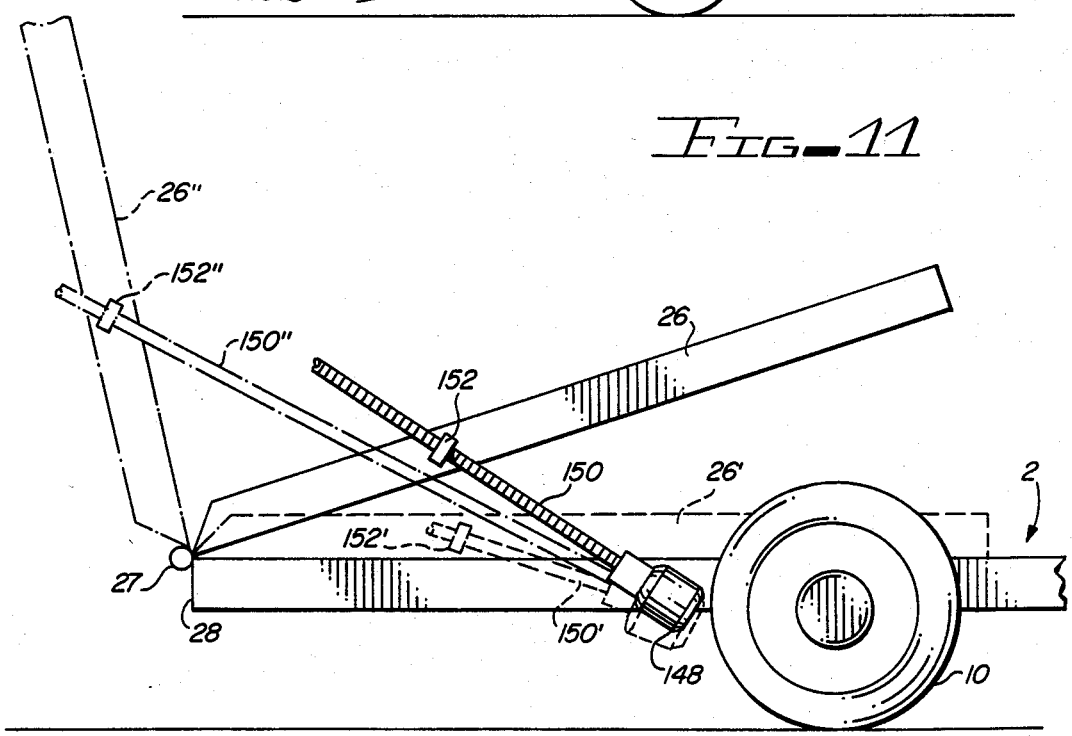
FIG. 11 shows an alternate embodiment of the trailer and portable dock apparatus shown in FIG. 10 wherein the main dock ramp is pivoted upwardly and rearwardly from its stowed position by an electric motor driving a threaded shaft which is engaged by a threaded collar secured to the main dock ramp.

FIG. 11 illustrates an alternate mechanism for pivoting main dock ramp 26 between its stowed and rearwardly extending positions. As shown in FIG. 11, an electric motor 148 is mounted to a frame member of trailer 2 in a manner which allows motor 148 to pivot slightly within a vertical plane. Electric motor 148 is of the reversible direction type and is used to rotate an elongated threaded shaft 150. An internally threaded collar 152 threadedly engages shaft 150 and is mounted to one side edge of main dock ramp 26 in a manner which allows collar 152 to rotate about a horizontal axis. Assuming main dock ramp 26 to initially be in its stowed position (indicated by dashed lines 26'), rotation of threaded shaft 150 in a direction tending to lengthen the distance between motor 148 and threaded collar 152 causes main dock ramp 26 to be pivoted upwardly about hinge 27 away from trailer 2 to the position shown by the solid lines in FIG. 11. Further rotation of threaded shaft 150 causes main dock ramp 26 to continue to be pivoted rearwardly about hinge 27 to the position indicated by dashed lines 26'. Further operation of electric motor 148 causes main dock ramp 26 to be fully extended to a horizontal, rearwardly extending position.

Figure 12:
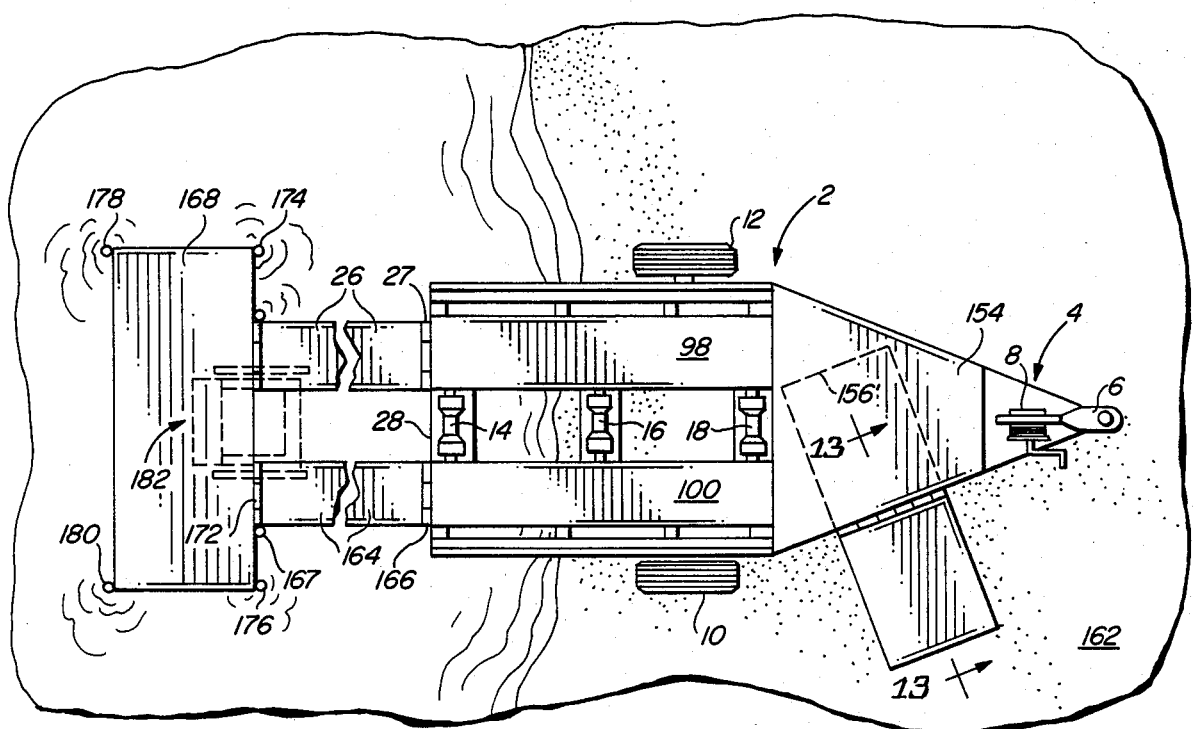
FIG. 12 is a top view of the trailer and portable dock apparatus showing an embodiment particularly suited for usage by persons confined to wheelchairs.
Figure 13:
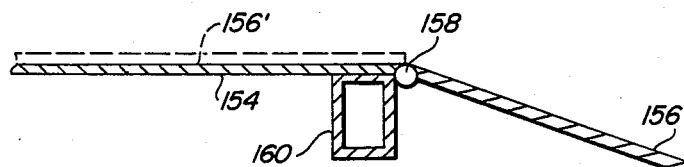
FIG. 13 is a cross-sectional view of a hinged access ramp taken through the plane designated by lines 13—13 within FIG. 12 and shows the access ramp pivoted between stowed and extended positions.

Referring now to FIG. 12, an alternate embodiment of the present invention is illustrated, including modifications particularly adapted to allow persons confined to wheelchairs to gain access to the portable dock and conveniently enter and leave a boat docked thereto. The components shown within FIG. 12 that are identical with those already described with regard to FIG. 1 are designated by corresponding reference numerals. However, in FIG. 12, it will be noted that the portion of wheeled boat trailer 2 in front of keel roller 18 is entirely covered by flooring 154 for allowing increased maneuverability of a wheelchair thereupon. In addition, a ramp 156 is hingedly coupled along one of its edges to an outer edge of flooring 154 by hinge 158 and extends downwardly therefrom toward the ground 162. Referring briefly to FIG. 13, hinge 158 may be secured to an outer edge of frame member 160 to ensure that ramp 156 is adequately supported along its upper edge by trailer 2. Ramp 156 provides convenient access from the ground 162 up to flooring 154 by wheelchairs, wheeled dollies, and the like. As shown in FIGS. 12 and 13, ramp 156 may be pivoted upwardly to a stowed position (designated by dashed lines 156') overlying flooring 154 when not in use.

Still referring to FIG. 12, main dock ramp 26 again extends rearwardly from the rear end 28 of trailer 2, and the remote end thereof is supported above the surface of the water by support leg 32. As before, main dock ramp 26 is colinear with walkway 98. However, a second main dock ramp 164 also extends rearwardly from rear edge 28 of trailer 2 and is essentially a mirror image of main dock ramp 26 about the longitudinal axis of trailer 2. Dock ramp 164 is coupled to trailer 2 by hinge 166 at a first end thereof, the second end of ramp 164 being supported above the surface of the water by support leg 167. Each of dock ramps 26 and 164 is coupled by hinges 170 and 172, respectively, to an enlarged dock ramp extension 168 which, for example, might measure 3½ feet by 7 feet for allowing a wheelchair to be conveniently maneuvered thereupon. Dock ramp extension 168 is equipped with support legs 174, 176, 178 and 180 at its four corners for supporting the same above the surface of the water. In order to allow a wheelchair (designated by dashed lines 182 within FIG. 12) to be moved from flooring 154 to dock ramp extension 168, the spacing between walkways 98 and 100, and the spacing between dock ramps 26 and 164 is maintained at the minimum distance needed to provide clearance for keel support rollers 14, 16 and 18, and is preferably maintained at a distance of less than two feet. Dock ramp extension 168 and dock ramps 26 and 164 may be elevated prior to backing the same into the water in a manner similar to that described above in regard to FIGS. 7A and 7B.

Figure 14:
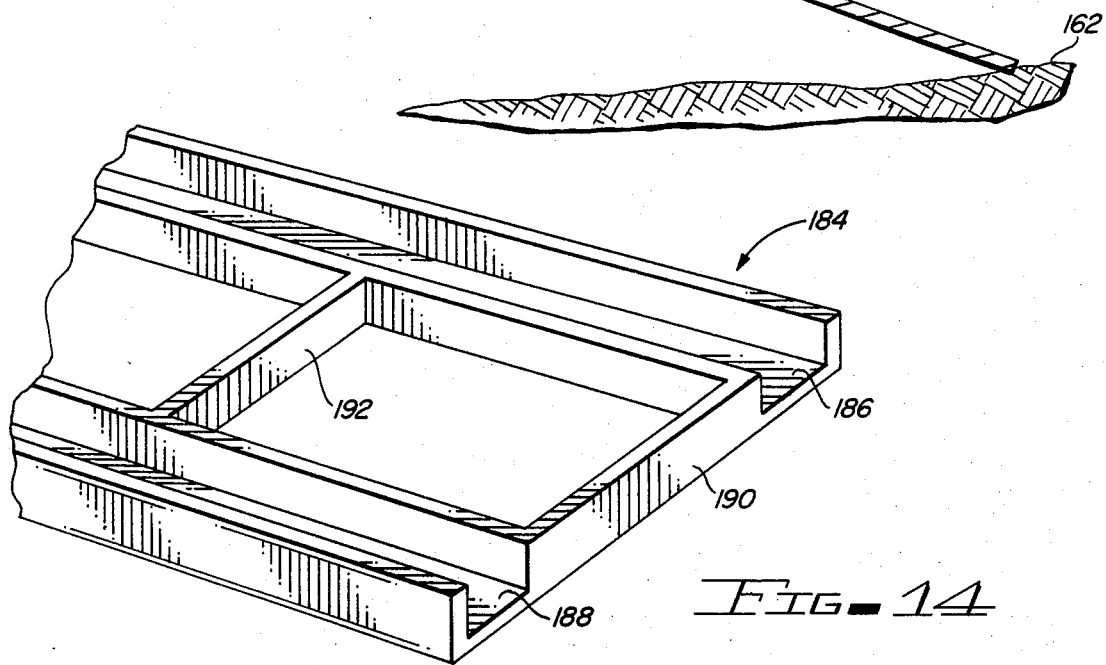
FIG. 14 is a perspective view of a portion of a main dock ramp particularly designed for usage by persons confined to wheelchairs.

In an alternate embodiment of the apparatus shown in FIG. 12, walkways 98 and 100, and dock ramps 26 and 164 are replaced by pairs of wheel guiding channels as shown in FIG. 14, which wheel guiding channels are spaced apart by the same distance as are the opposing side of the wheels of conventional wheelchairs. Referring to FIG. 14, ramp structure 184 includes a first wheel guiding channel 186 and a second wheel guiding channel 188 disposed parallel thereto, channels 186 and 188 being spaced apart from one another by a plurality of cross members, such as those designated 190 and 192. Ramp structure 184 may be used in place of walkways 98 and 100 and/or in place of dock ramps 26 and 164.

Those skilled in the art will now apprecite that a boat trailer and portable dock apparatus has been described which offers significant advantages over boat trailers serving as portable docks and already known in the art. The apparatus described herein may be conveniently stored as a compact structure within a conventional wheeled boat trailer when not in use, yet is capable of providing a portable dock which extends significantly outward beyond the rear end of the wheeled boat trailer. The portable dock apparatus is of relatively simple and inexpensive construction and may easily be added to existing boat trailers. Because the portable dock extends significantly beyond the rear end of the trailer, it is less likely that the user will need to back the trailer itself sufficiently far into the water to cause submersion of the wheel bearings of the trailer. Nonetheless, even if the trailer is backed significantly into the water, the present invention provides a simple means for raising the rear end of the trailer, as well as the wheel bearing assemblies, out of the water. By providing a means for elevating the portable dock extending rearwardly from the trailer, the portable dock may be conveniently assembled on dry land and subsequently elevated for allowing the trailer and the portable dock extending therefrom, to be quickly and easily backed into the water and subsequently lowered.

While the present invention has been described with reference to a preferred embodiment thereof, the description is for illustrative purposes only and is not to be construed as limiting the scope of the invention. For example, support legs 32, 34 and 42, 44 may be replaced by floatation devices for buoying the remote ends of the various dock ramps above the surface of the water. Furthermore, the pivoting mechanism shown in FIG. 11 and including electric motor 148 and threaded shaft 150 may be replaced by a hydraulic piston mounted to trailer 2 powered by hydraulic fluid pressurized by an electric motor for selectively extending or retracting a ram coupled between the hydraulic piston and main dock ramp 26. Various other modifications and changes may be made by those skilled in the art without departing from the true spirit and scope of the invention as defined by the appended claims.

I claim:

1. A boat trailer and portable dock apparatus for towing a boat to a body of water and for providing a dock after the boat is launched, said apparatus comprising in combination:
   a. a wheeled boat trailer for carrying a boat and having a front end from which said apparatus may be towed by a motorized vehicle and having a rear end from which the boat may be launched into a body of water;
   b. a main dock ramp having a first end hingedly connected to the rear end of said wheeled boat trailer and a second end opposite the first end thereof, said hinged connection permitting said main dock ramp to be extended outwardly from the rear end of said wheeled boat trailer in an extended position over the body of water;
   c. first support means coupled to said main dock ramp proximate the second end thereof for supporting the second end of said main dock ramp above the surface of the body of water in a substantially horizontal position;
   d. elevating means secured to said wheeled boat trailer and coupled to said main dock ramp for pivoting the second end of said main dock ramp upwardly about said hinged connection to allow said apparatus to be backed into or pulled from the body of water by moving said wheeled boat trailer while said main dock ramp extends rearwardly from said wheeled boat trailer;
   e. said hinged connection between said main dock ramp and said wheeled boat trailer allowing said main dock ramp to lie substantially horizontally across said wheeled boat trailer in a stowed position with the second end of said main dock ramp directed toward the front end of said wheeled boat trailer when the boat is being carried by said wheeled boat trailer; and
   f. pivoting means secured to said wheeled boat trailer and coupled to said main dock ramp for pivoting said main dock about said hinged connection from said stowed position toward said extended position, said pivoting means comprising:

i. a lever arm having a first end secured to said main dock ramp proximate said hinged connection, said lever arm extending generally downward when said main dock ramp is in its stored position, said lever arm having a second end opposite the first end thereof;

ii. a winch secured to said wheeled boat trailer;

iii. a first cable extending between said winch and the second end of said lever arm for pulling forwardly and upwardly on the second end of said lever arm as said winch is tightened to pivot said main dock ramp away from its stowed position.

2. An apparatus as recited by claim 1 including a second cable having a first end secured to the second end of said main dock ramp and having a second end engaging said first cable at a point thereof between said lever arm and said winch, said second cable remaining relatively slack as said main dock ramp is pivoted away from its stowed position but becoming taut after the second end of said main dock ramp passes behind the first end thereof to facilitate the lowering of said main dock ramp toward said extended position.

3. A boat trailer and portable dock apparatus for towing a boat to a body of water and for providing a dock after the boat is launched, said apparatus comprising in combination:

a. a wheeled boat trailer for carrying a boat and having a front end from which said apparatus may be towed by a motorized vehicle and having a rear end from which the boat may be launched into a body of water;

b. a main dock ramp having a first end hingedly connected to the rear end of said wheeled boat trailer and a second end opposite the first end thereof, said hinged connection permitting said main dock ramp to be extended outwardly from the rear end of said wheeled boat trailer in an extended position over the body of water;

c. first support means coupled to said main dock ramp proximate the second end thereof for supporting the second end of said main dock ramp above the surface of the body of water in a substantially horizontal position;

d. elevating means secured to said wheeled boat trailer and coupled to said main dock ramp for pivoting the second end of said main dock ramp upwardly about said hinged connection to allow said apparatus to be backed into or pulled from the body of water by moving said wheeled boat trailer while said main dock ramp extends rearwardly from said wheeled boat trailer;

e. a pair of stabilizer legs downwardly extendable from opposite sides of the rear end of said wheeled boat trailer for engaging the bed of the body of water to stabilize the rear end of said wheeled boat trailer;

f. fastening means for locking said stabilizer legs in an extended position to support the rear end of said wheeled boat trailer above the surface of the body of water; and g. lifting means for lifting the rear end of said wheeled boat trailer relative to the bed of the body of water and thereby raising the wheels of said wheeled boat trailer above the surface of the body of water, said lifting means including:

i. a winch secured to said wheeled boat trailer near the front end thereof for allowing said winch to be used to pull the boat from the body of water into said wheeled boat trailer;

ii. a lifting leg slidably coupled to said wheeled boat trailer proximate the rear end thereof and downwardly extendable therefrom;

iii. a pulley secured to the uppermost end of said lifting leg; and iv. a cable extending from said winch over said pulley and secured to said wheeled boat trailer rearwardly of said lifting leg, wherein tightening of said cable through operation of said winch causes said lifting leg to engage the bed of the body of water and to pull the rear end of said wheeled boat trailer upwardly for allowing said stabilizer legs to be extended downwardly until they engage the bed of the body of water.

* * * * *